(12) United States Patent
Weise et al.

(10) Patent No.: US 8,141,910 B2
(45) Date of Patent: Mar. 27, 2012

(54) PLUMBING APPARATUS

(76) Inventors: Gary K. Weise, Plancentia, CA (US); Richard J. Kesl, Plancentia, CA (US)

(*) Notice: Subject to any disclaimer, the term of this patent is extended or adjusted under 35 U.S.C. 154(b) by 722 days.

(21) Appl. No.: 11/901,024

(22) Filed: Sep. 14, 2007

(65) Prior Publication Data
US 2008/0048438 A1 Feb. 28, 2008

Related U.S. Application Data

(63) Continuation-in-part of application No. 10/979,444, filed on Nov. 1, 2004, now abandoned.

(51) Int. Cl.
*F16L 39/00* (2006.01)

(52) U.S. Cl. ................... 285/133.3; 285/133.11

(58) Field of Classification Search ............ 285/133.11, 285/133.21, 133.3, 133.4, 133.5, 188, 129.2, 285/197
See application file for complete search history.

(56) References Cited

U.S. PATENT DOCUMENTS

| | | | | |
|---|---|---|---|---|
| 622,897 A * | 4/1899 | Lawler | | 138/37 |
| 785,130 A * | 3/1905 | Vanderman | | 138/37 |
| 788,803 A * | 5/1905 | Walker | | 285/129.2 |
| 1,208,049 A * | 12/1916 | Tillman | | 138/37 |
| 1,276,291 A * | 8/1918 | Walling | | 285/133.4 |
| 1,911,454 A * | 5/1933 | Luff | | 285/129.2 |
| 1,986,010 A * | 1/1935 | O'Laughlin | | 285/289.5 |
| 2,039,542 A * | 5/1936 | Lindquist | | 285/133.3 |
| 2,791,450 A * | 5/1957 | Hombach | | 285/133.3 |
| 3,654,008 A * | 4/1972 | Rogers et al. | | 156/152 |
| 3,850,459 A * | 11/1974 | Blumenkranz et al. | | 285/133.3 |
| 3,861,720 A * | 1/1975 | Rogers et al. | | 285/133.3 |
| 3,894,302 A * | 7/1975 | Lasater | | 4/696 |
| 4,624,487 A * | 11/1986 | Thalmann | | 285/197 |
| 4,810,008 A * | 3/1989 | Brodie | | 285/31 |
| 5,248,218 A * | 9/1993 | Belcher | | 405/43 |
| 5,316,349 A * | 5/1994 | Rafeld | | 285/133.3 |
| 5,551,733 A * | 9/1996 | Henwood | | 285/133.11 |
| 5,979,945 A * | 11/1999 | Hitachi et al. | | 285/125.1 |
| 6,056,014 A * | 5/2000 | Kojima et al. | | 138/39 |
| 6,315,331 B1 * | 11/2001 | Krause et al. | | 285/133.11 |
| 6,427,665 B1 * | 8/2002 | Knoedl et al. | | 123/456 |
| 6,634,335 B2 * | 10/2003 | Boecking et al. | | 123/456 |
| 6,991,263 B2 * | 1/2006 | Zarubaiko | | 285/133.11 |
| 6,994,117 B2 * | 2/2006 | Flynn et al. | | 138/98 |
| 7,021,291 B2 * | 4/2006 | Denton et al. | | 123/456 |
| 7,055,865 B2 * | 6/2006 | Riordan et al. | | 285/133.21 |
| 7,066,148 B2 * | 6/2006 | Nishiwaki | | 123/456 |
| 7,278,400 B2 * | 10/2007 | Denton et al. | | 123/456 |
| 2002/0112697 A1 * | 8/2002 | Knoedl et al. | | 123/456 |
| 2003/0127852 A1 * | 7/2003 | Usui | | 285/125.1 |
| 2005/0035595 A1 * | 2/2005 | Wenke et al. | | 285/197 |

* cited by examiner

*Primary Examiner* — Aaron Dunwoody
(74) *Attorney, Agent, or Firm* — Terry L. Miller (57) ABSTRACT

The present invention provides a plumbing apparatus that includes an offset or tangential T-fitting providing for offsetting a branch pipe from a run pipe in end elevation view, and for the branch pipe to intersect the run pipe orthogonally in side elevation view. That is, the branch pipe may intersect the run pipe substantially tangentially, so that an arrangement of plumbing fittings and devices may be nested into a thinner wall or into a smaller dimension of space than would be the case if a conventional T-fitting were employed. By use of the inventive T-fitting a considerable savings in materials of construction may be realized in the construction of swimming pools and spas, for example. Particularly, the present inventive offset or tangential T-fitting provides for the installation of bubble jet fittings and associated piping into a comparatively thin (i.e., about 6 inches thick) dam wall between a swimming pool and spa.

7 Claims, 9 Drawing Sheets

PLUMBING APPARATUS

CROSS REFERENCE TO RELATED APPLICATION

This application is a Continuation-in-Part of U.S. patent application Ser. No. 10/979,444, filed 1 Nov. 2004, now abandoned, and the disclosure of which is incorporated herein by reference to the extent necessary for a complete an enabling disclosure of the present invention.

BACKGROUND OF THE INVENTION

The present invention relates generally to a plumbing apparatus, and particularly to a plumbing apparatus or fitting for use with water, and which is fabricated of frangible plastic material allowing for adhesive connection of plumbing components. More particularly, the present invention relates to a plumbing fitting generally of T-configuration for forming a part of a water circulation or distribution system. The inventive plumbing fitting is particularly useful in a water circulation or distribution system for a swimming pool, hot tub, or spa, for example.

In a spa that is adjacent to a pool, it is conventional to have a wall between and common to both the pool and the spa. This wall is conventionally formed of concrete, in common with the rest of the pool and spa. Such a common shared wall is generally referred to as a "dam wall." The dam wall of a pool/spa is generally only about six inches (15.24 cm) thick in order to use the generally available size of decorative tile. In such cases, the generally available plumbing fittings make it very difficult or impossible to install bubble jets in the dam wall. In order to allow the installation of bubble jets in the dam wall, some pool/spa installations undesirably use a dam wall that is thicker than six inches. In such cases, the dam wall may be as thick as nine inches (22.86 cm) or even twelve inches (30.48 cm). Such a thick dam wall necessitates an increase in the materials used to construct the pool/spa, and increases the costs of materials and construction.

Also, when bubble jets are installed in the dam wall or in the other walls of a spa or pool, they are necessarily close to the reinforcing bars (i.e., "rebar") required in these walls to reinforce and prevent cracking of the concrete. Conventionally, each such bubble jet is supplied with air from one manifold pipe embedded in the wall of the spa or pool; and from another manifold pipe also embedded in the wall of the spa or pool wall the bubble jet fitting is supplied with pressurized water to drive a jet of bubbly water. As a result, because of the sizes of the manifold pipes and of the bubble jet fittings, even when these relatively large manifold pipes are spaced adjacent to the reinforcing bars, the walls of the spa or pool must be made thicker than is desired in order to provide sufficient material into which the pipes and fittings can be embedded. Accordingly, the use of construction materials, especially the use of concrete to construct the pool walls, increases as a result of the conventional configuration of plumbing fittings.

Particularly, this increased use of construction materials is the case because that extra thickness of the pool or spa walls which is necessary simply to accommodate the plumbing pipes and fittings is generally carried over to other parts of the pool or spa wall as well. That is, even though many other parts of the spa or pool walls do not include plumbing fittings, they are nevertheless made thicker than would otherwise be necessary. As a result, the undesirably increased wall thickness for the pool wall which occurs because of the embedded plumbing fittings also appears over all or a substantial portion of the pool, greatly increasing the amount of concrete required for pool construction.

Further, during construction of in-ground spas and swimming pools utilizing plastic piping (which is frangible), it is common for a rough excavation in the ground to first be prepared. Then, it is common for the construction personnel to complete and contour the excavation in the earth, install the rebar (usually in a crossing or mesh pattern), install the necessary plumbing fittings by laying these plumbing fittings and connecting pipes into the excavation on or within the mesh of rebar, all preparatory to placing of concrete (i.e., sprayed-in-place concrete) which will form the walls and bottom of the spa or pool. In this context, it is desirable for the plumbing pipes and fittings to lay immediately adjacent to the rebar or adjacent to the earth of the excavation. This is true for at least two reasons. First, such a placement of the plastic piping and fittings economizes on the use of space, which space must be filled with concrete, thus reducing the concrete requirements for construction of the pool or spa. Secondly, during construction, with construction personnel working within the excavation which will become the pool or spa, it is not uncommon for pipe and fittings to be stepped on by construction personnel. Because the pipe and fittings are generally made of PVC plastic, which is frangible (or breakable), such an event of stepping on a pipe or fitting can result in breakage of the pipe or fitting, or both. If the breakage is discovered and repaired before the concrete is placed, only a minor expense and inconvenience results. However, in the event the breakage is not discovered and repaired before the pipe or fitting is encased in concrete, then a very expensive and time-consuming repair may be required.

Still further to the above, and still in the context of in-ground pools and spas which use PVC plastic pipe and fittings (or pipe and fittings made of other plastic materials which can be assembled with adhesive), it is desirable to have the plumbing system drain completely when water is removed from the system. Such is the case in the event, for example, that the pool is drained for winter, or for maintenance. Water which does not drain from the plumbing during winter, for example, may freeze and cause a pipe or fitting to break. Also, even in areas where freezing is not a concern, the water which remains in the plumbing of a drained pool or spa may grow algae, bacterial slim, or fungus, which can then require extra cleaning of the pool when it is to be refilled with water.

As can be seen, there is a need for an improved plumbing T-fitting that may be installed within a comparatively thin dam wall, such as within a six-inch dam wall, as often is desired for a spa, pool, and the like.

Also, there is a need for an improved plumbing T-fitting that may be installed close to the reinforcing bars of a pool or spa wall, or close to the earth within an excavation, so as to allow the pool wall to be constructed thinner and to us less concrete than is required by conventional plumbing fittings of T-configuration.

Further, it is desirable for a plumbing T-fitting to be configured so that the frangible material (i.e., plastic) of the fitting is less likely to be broken by the fitting or pipes connecting to that fitting being stepped upon.

SUMMARY OF THE INVENTION

In view of the deficiencies of the conventional technology, an objective for this invention is to reduce or eliminate one or more of these deficiencies.

Accordingly, as realized in one particularly preferred exemplary embodiment, the present invention provides a tangential T-fitting having a through passage which at each of its opposite ends is provided with features for connecting the T-fitting into a manifold pipe at a pool or spa. For example, the T-fitting may be provided with a pair of threaded bore sections, one at each end and opening in opposite directions to facilitate connection in a run of threaded pipe to the tangential T-fitting. Alternatively, the tangential T-fitting may include simple cylindrical sockets for use with an adhesively bonded pipe construction, such as is commonly used with PVC pipe, so that the tangential T-fitting may be connected or bonded into a run of PVC pipe.

The tangential T-fitting is provided with at least one other connection feature, which is arranged offset from the centerline of the through passage. This offset connection may be arranged to be substantially tangential with the through passage. Accordingly, the tangential T-fitting provides for a connection to the run of pipe which is offset or tangential to this run of pipe. By use of such an offset connection, the run of pipe may be spaced closer to rebar or other structure embedded in a concrete wall, and the wall may be made thinner and use less concrete than would otherwise be possible.

An advantage of the present invention is the resistance to being broken provided by the configuration of the T-fitting, in the event the fitting is stepped upon, or the pipes connected to the fitting are stepped upon, for example.

Further to the above, because of the configuration of the present inventive T-fitting, the fitting and connected pipes will reside close to a supporting surface, both reducing the chance of damage to the fitting and pipes, and making installation easier for construction personnel.

These and other aspects, objects, features and advantages of the present invention will become clear from a reading of the following detailed description of exemplary preferred embodiments of the invention when considered in conjunction with the accompanying drawings.

DETAILED DESCRIPTION OF PREFERRED EXEMPLARY EMBODIMENTS OF THE INVENTION

The following detailed description provides a disclosure of the best currently contemplated modes of carrying out the invention. The description is not to be taken as a limitation on the invention, but is provided merely for the purpose of illustrating exemplary embodiments of the invention which are particularly preferred, and by so doing, to bring forth the general principles of the invention. The spirit and scope of the invention is defined by the appended claims.

A plumbing fitting of T-configuration (herein generally referred to as a "tangential-T fitting" or "T-fitting", or simply as a "fitting") is useful for installing plumbing (i.e., piping and associated fittings and connections) into a space which is smaller than the space needed for conventional T-fittings. This tangential-T fitting also has advantages in connecting run piping (that is aligned pipes) and intersecting pipes (or branch pipes), which are the same size or of differing sizes. As so connected, the run and intersecting or branch pipes can both drain fully, even when these pipes are of differing sizes. Still further, as will be explained more fully below, the present tangential-T fitting has advantages during installation of piping, which because of its plastic (i.e., frangible) nature, may be easily and inadvertently damaged during installation.

Further to the above, it will be appreciated that space is gained by use of the present invention because other plumbing fittings and pipes which are attached to the tangential T-fitting, can be arranged or "nested" to better take advantage of available space. As a result, the plumbing fitting according to this invention may be installed within a six-inch dam wall such as is often desired for a spa or pool.

Also, the reliability of new installations of plumbing at a pool or spa is improved by use of the present invention, because damage to the frangible plastic piping and fittings is made less likely by use of the present tangential-T fitting.

Further, installation of plumbing pipes and fittings may be made easier for construction personnel by use of the present tangential-T fitting because the fitting and connected piping will reside immediately adjacent to a supporting surface or wall.

Figure 1:
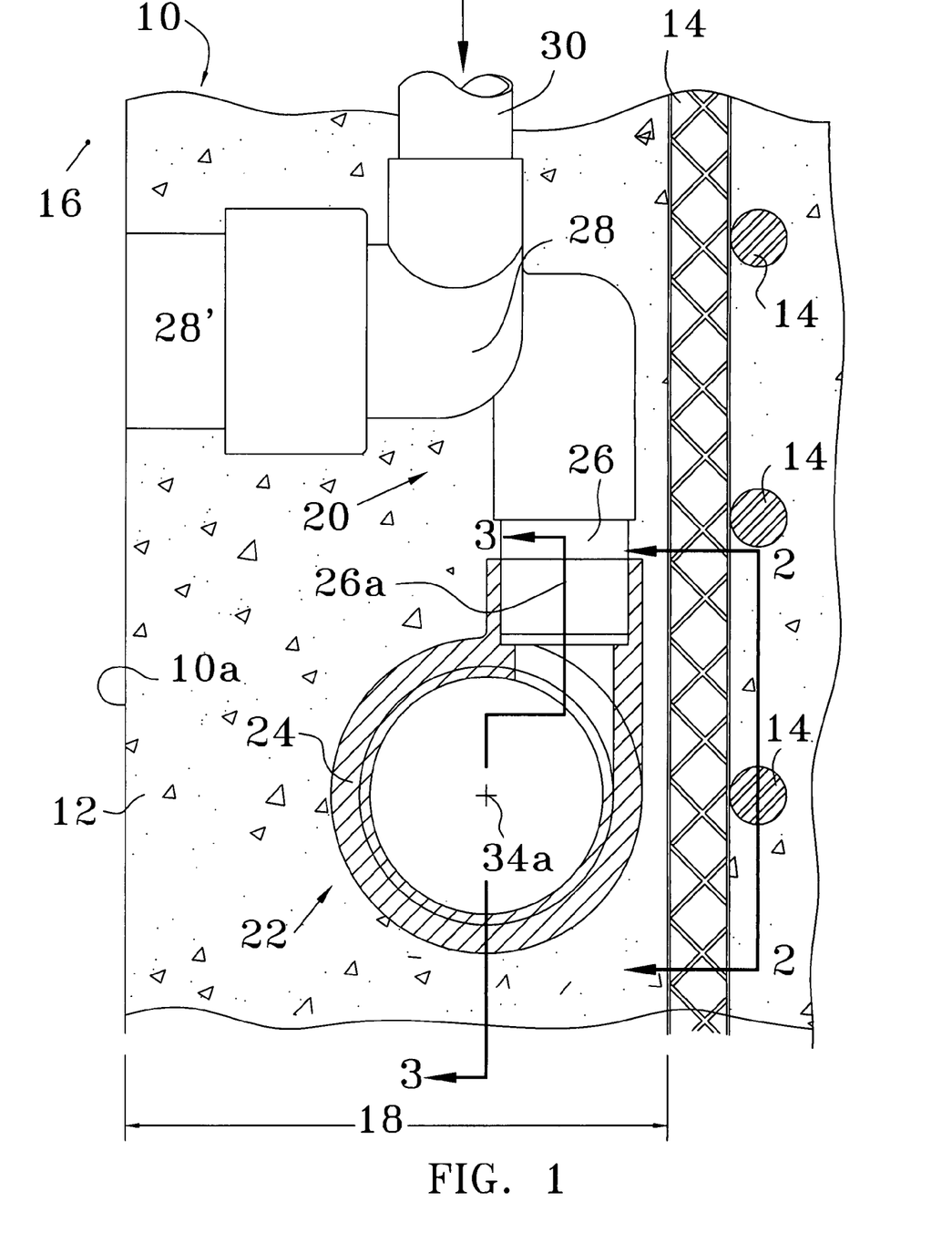
FIG. 1 is an end elevation view, partially in cross section, of a plumbing arrangement including a plumbing fitting (i.e., T-fitting or tangential-T fitting), according to one embodiment of the present invention.

In more specifically describing the present invention, and as can be appreciated from viewing FIG. 1, a wall structure 10, such as a wall or a swimming pool or spa, includes a body 12 of concrete (i.e., cement and aggregate), and an array of reinforcing bars 14 (commonly referred to as "rebar" and only one of which is seen in side view in FIG. 1). On one side of the wall 10, the surface 10a is exposed to water 16 to a level above that shown by this Figure. The wall 10 on its other side (i.e., toward the right hand side of this wall 10 as seen in the drawing Figure) may be exposed also to water or may be abutted by earth, for example. However, it is to be noted that the lateral dimension or space 18 between the reinforcing bar 14 and the surface 10a is somewhat limited. In fact, it is desired to make this dimension 10a smaller than is conventionally possible, because doing so will reduce the amount of concrete required to construct the wall 10. However, as is seen in FIG. 1, the wall 10 also includes a plumbing arrangement, generally indicated with the arrowed numeral 20.

The plumbing arrangement 20 includes a lower water manifold pipeline (indicated with the arrowed numeral 22—and best viewed in FIG. 2), a tangential T-fitting 24 in the pipeline 22, a connecting branch pipe 26, extending from the fitting 24 to a bubble jet fitting 28, an exit nipple 28' extending from the fitting 28 to the surface 10a, and an upper connecting pipe 30. Those ordinarily skilled in the pertinent arts will appreciate that the upper connecting pipe 30 extends downwardly to the fitting 28 from an upper air manifold pipeline (not seen in the drawing Figures), which is similar to the water pipeline 22. Further consideration of the tangential-T fitting 24 (best viewed with consideration of FIG. 2) will show that the pipeline 22 includes two sections of pipe each continued on a respective side of this fitting 24 and connecting into the fitting 24. This continued pipeline 22 is sometimes referred to as a "run" pipe. On the other hand, the branch pipe 26, is sometimes commonly referred to as an "intersecting" pipe.

Moreover, examination of the tangential-T fitting 24 (again referring to FIG. 2, and to FIGS. 3 and 4 also) will reveal that it includes a body 32 defining a through bore or passage 34 communicating the pipeline flow for the pipe 22. The body 32 is formed of PVC or other plastic material facilitating adhesive bonding of the run and branch piping (which is also plastic) with the tangential-T fitting 24. The through passage 34 has a center line 34a, and it will be noted that the connecting branch pipe 26 is tangential at one side to the passage 34, and is offset at its center line 26a from the center line 34a. That is, viewing FIG. 4 in particular, it is seen that on the right hand side (i.e., as seen by the viewer of FIG. 4), a wall portion 32b of the body 32 is substantially tangent at its outside surface 32c with the wall portion 32d. As will be explained, the wall portion 32b forms part of a boss (to be further explained) forming a socket for adhesive attachment of the pipe 26 into the tangential-T fitting 24. Similarly, within the tangential-T fitting 24, a flow path 26b bounded by the wall portion 32b is also substantially tangent at its surface 26b' with the respective side of through passage 34, as will also be further explained.

Further to the above, one aspect and advantage of the present tangential-T fitting 24 is seen in FIG. 1, in which it is seen that because the tangential T-fitting allows the centerline 34a of pipeline 22 to be offset relative to the connecting branch pipe 26 (and toward surface 10a), this pipeline 22 is commensurately moved away from the position it would otherwise occupy relative to the reinforcing bar 14. Thus, the plumbing arrangement 20 can be nested in the available space 18 between the rebar 14 and surface 10a, and the dimension 18 can be made smaller than would be the case were a conventional T-fitting used in the pipeline 22.

Figure 2:
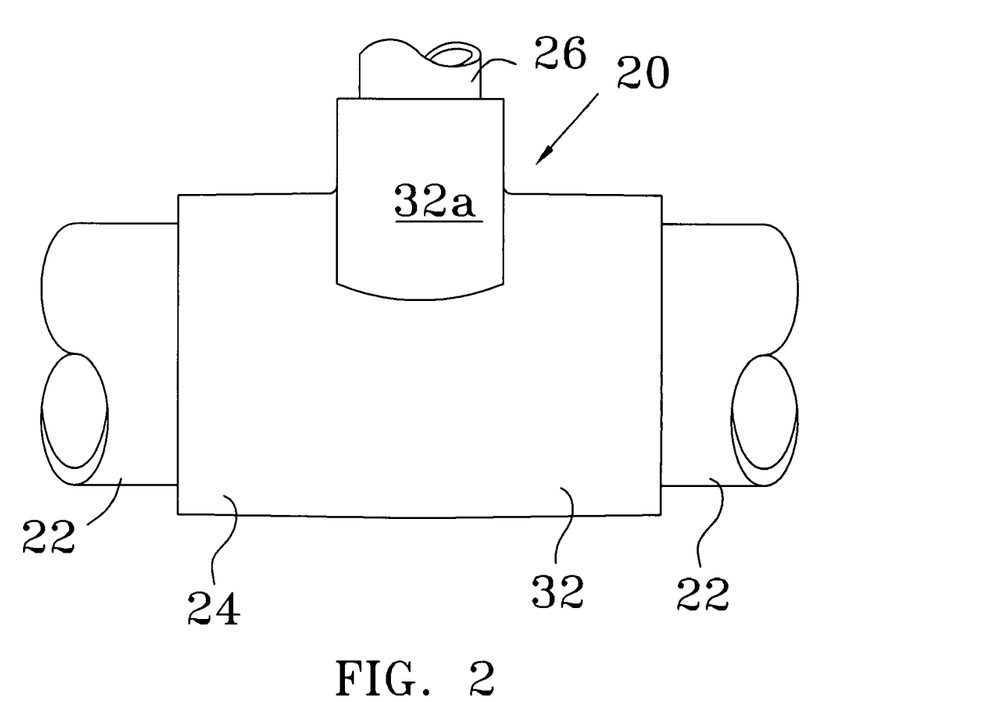
FIG. 2 is a fragmentary side elevation view of the plumbing fitting seen in FIG. 1, and is taken in the direction of arrows 2-2 on FIG. 1.
Figure 3:
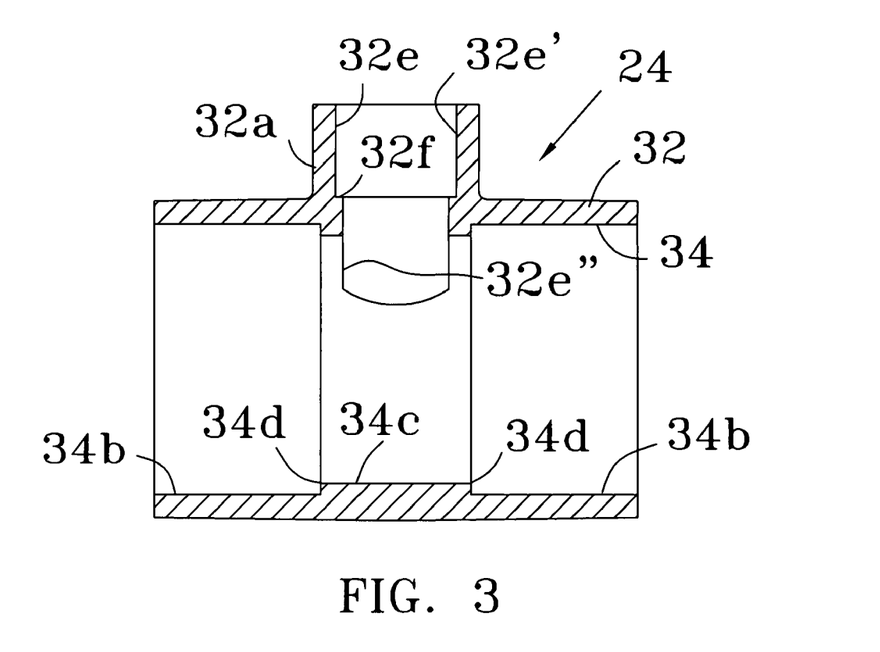
FIG. 3 is the fragmentary side elevation view, partially in cross section, taken at the plane of line 3-3 on FIG. 1, and looking in the direction of the arrows.
Figure 4:
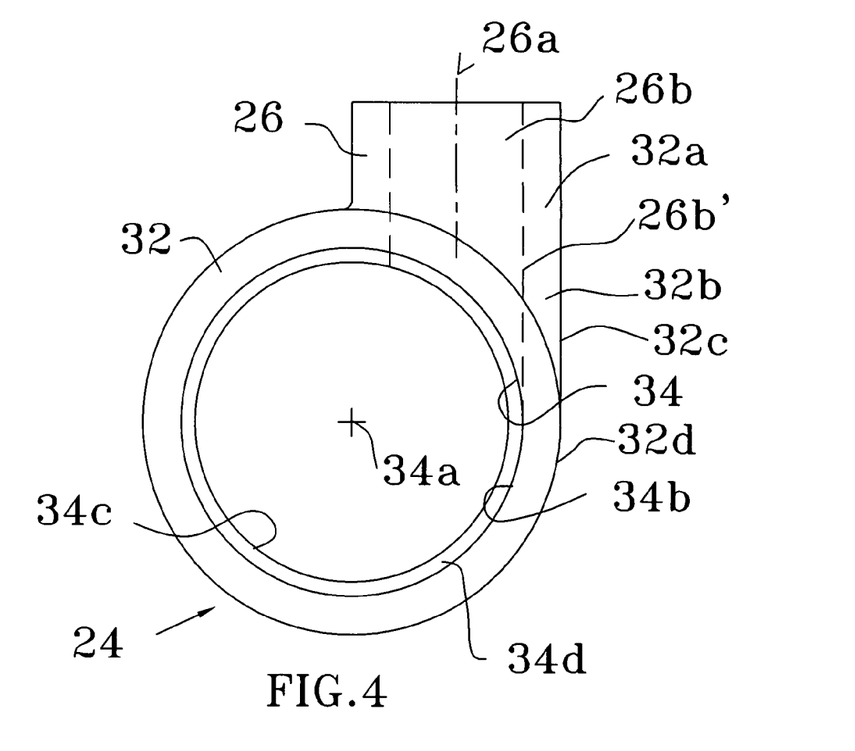
FIG. 4 is an end elevation view, similar to the view of FIG. 1, and shows the plumbing fitting apart from its connections to a run of piping in order to improve clarity of illustration.

Further considering FIGS. 1-4, and particularly FIG. 3, it is seen that the body 32 of the tangential T-fitting 24 defines passage 34 as a stepped through bore having a centerline 34a, and a pair of opposite larger-diameter bore sections 34b, as well as a centrally disposed smaller-diameter bore section 34c. The sections 34b and 34c of bore 34 cooperatively define a pair of oppositely disposed shoulders 34d on the bore 34. Those ordinarily skilled in the pertinent arts will appreciate that the bore portions 34b provide pipe sockets into which terminating end portions of adjacent runs of PVC (or other plastic) pipe 22 may be adhesively bonded. In this context, the shoulders 34d define the maximum extent or limit of the penetration of the end portions of the adjacent pipe runs 22 into the pipe sockets of the tangential T-fitting 32.

Similarly, the tangential T-fitting 32 includes an orthogonally disposed cylindrical boss 32a which at its center is offset from the centerline 34a of the passage 34 (recalling FIG. 1 and the description above). As is best seen in FIGS. 1, 3, and 4, this cylindrical boss 32a defines a stepped through bore 32e. The stepped bore 32e includes a larger diameter section 32e', and a smaller diameter section 32e". These sections 32e' and 32e" cooperatively define an outwardly disposed shoulder 32f, so that the cylindrical boss 32a also provides a pipe socket for receiving and adhesive bonding of the orthogonally disposed branch pipe 26 seen in FIGS. 1, 2, and 4.

Again, and as was explained in part above, it will be noted viewing FIGS. 1 and 4, and especially viewing FIG. 3, that the right hand side of the bore section 32e" is substantially tangential to the bore 34. Accordingly, the centerlines 26a and 34a of the pipes 26 and 22 do not intersect or align with one another in an end elevation view (i.e., FIGS. 1 and 4) of the plumbing arrangement 20. However, as is seen in FIG. 2, the centerlines 26a and 34a do intersect orthogonally in side elevation view. Consequently, the space or distance 18 seen in FIG. 1 can be made smaller than would be the case were a conventional T-fitting use in the plumbing arrangement 20, as was explained above.

Figure 5:
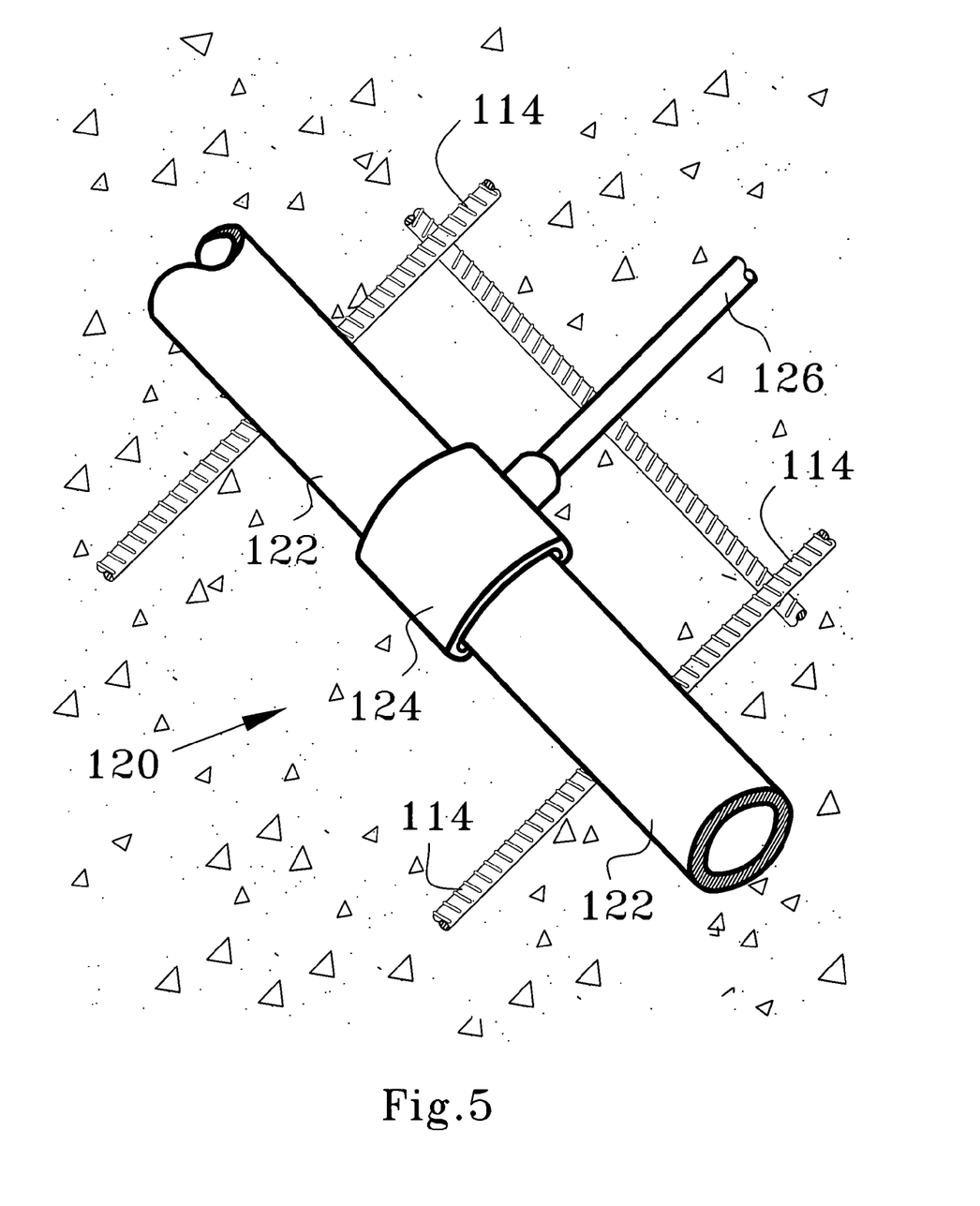
FIG. 5 provides a perspective, somewhat plan view, showing a plumbing fitting according to this invention connecting a run of pipe and a branch pipe, which branch pipe is smaller than the run pipe.
Figure 6:
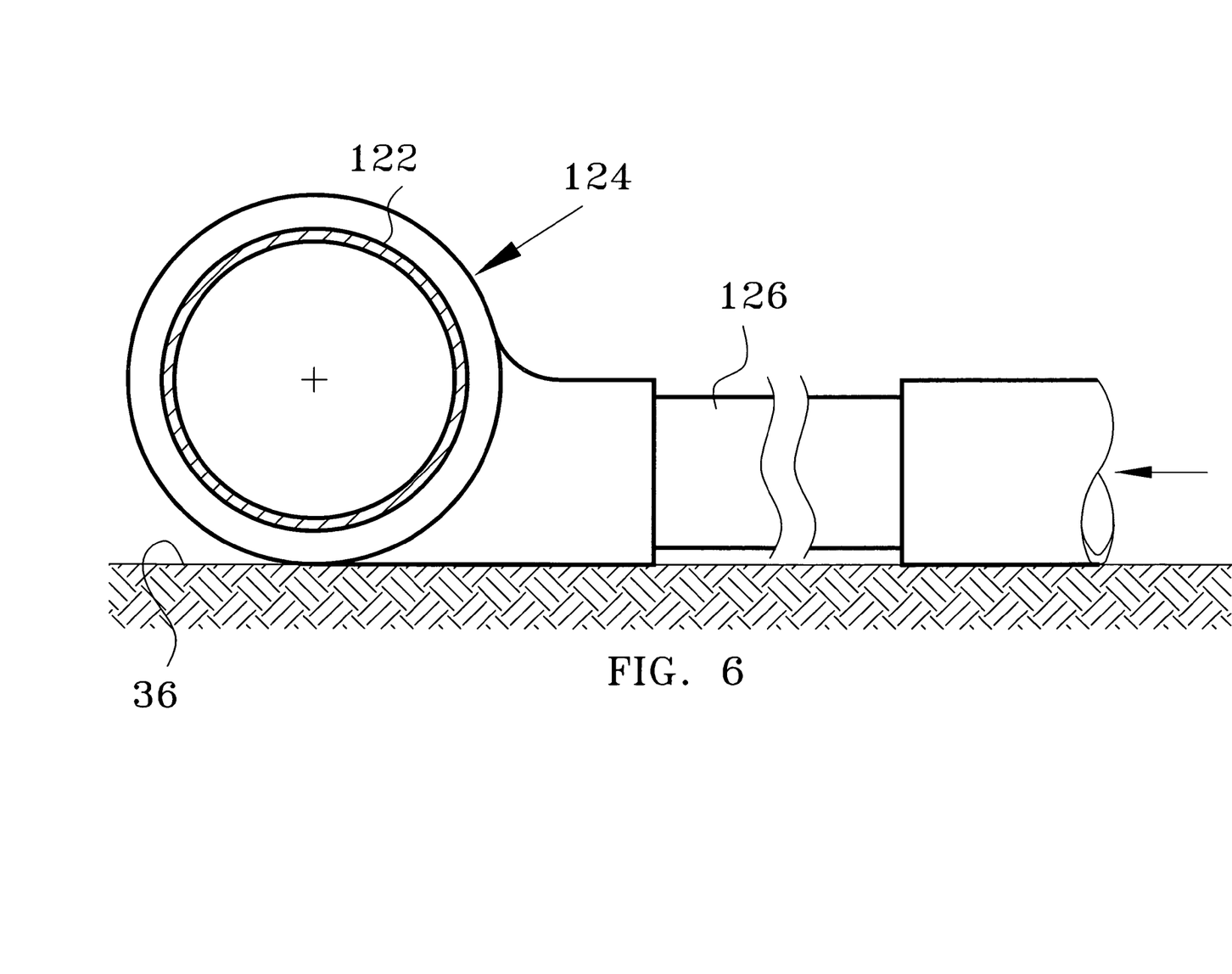
FIG. 6 is a side elevation view, partially in cross section, of the plumbing fitting seen in FIG. 5.
Figure 7:
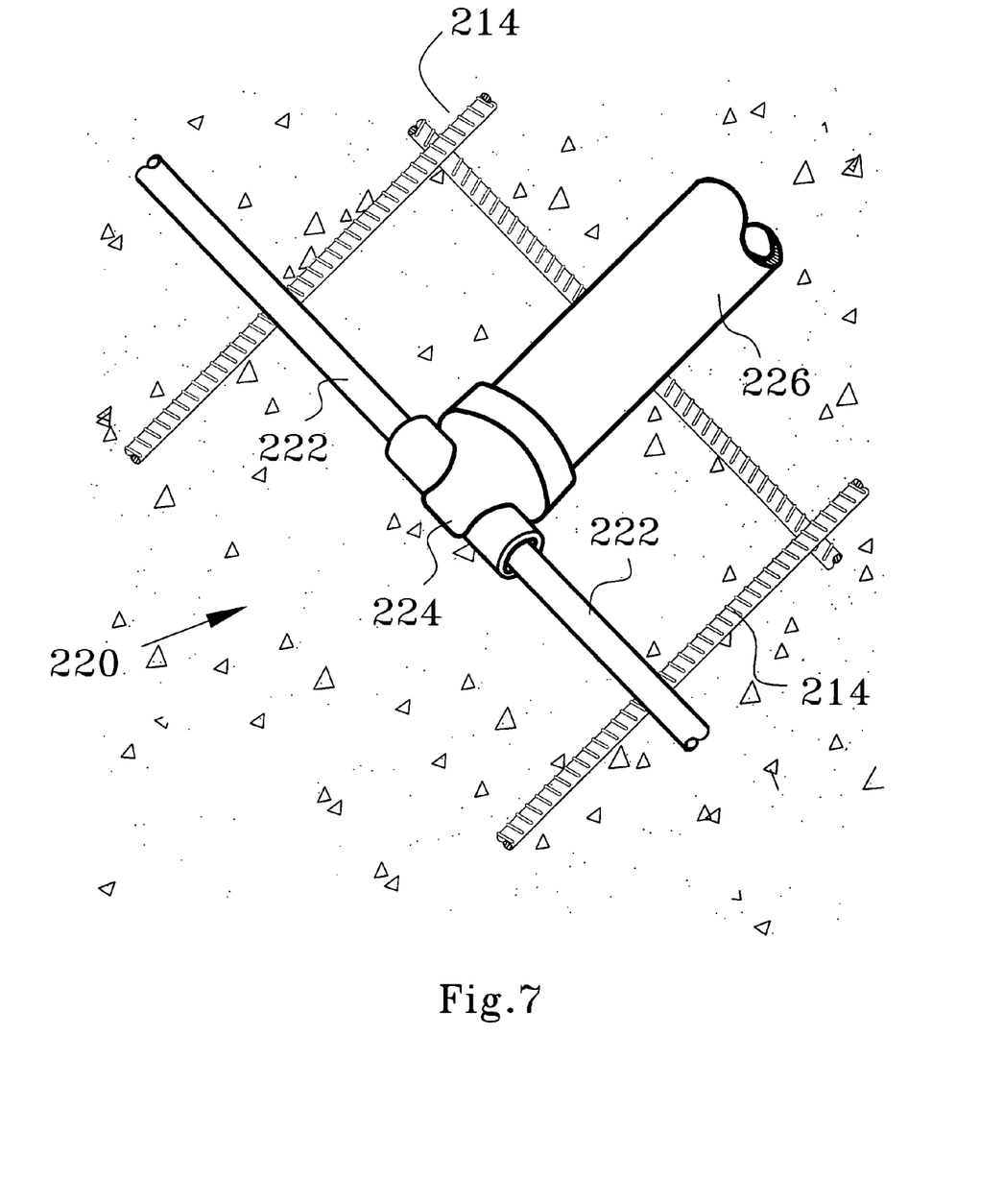
FIG. 7 provides a perspective, somewhat plan view similar to FIG. 5, but showing an alternative embodiment of plumbing fitting according to this invention connecting a run of pipe and a branch pipe, which branch pipe is larger than the run pipe.

However, FIGS. 5, 6, and 7 illustrate another advantage and use of the present tangential-T fitting. In these Figures features which have been described above are referenced with the same numeral used above, and increased by one-hundred (100). As is seen viewing FIGS. 5-7, and viewing FIG. 5 in particular, during the building of a pool or spa, after the excavation is prepared, and the rebar 114 is placed, the plumbing 120 (i.e., pipe and fittings) is placed in the excavation by laying out the pipe and fittings on top of or within the mesh of rebar 114. FIG. 5 illustrates a tangential-T fitting 124 as described above, connecting a run of pipe 122 with a branch pipe 126. In this case, the run pipe 122 is larger in diameter than the diameter of the branch pipe 126 (as was also the case in the embodiment first described). However, the invention is not so limited, and FIG. 7 illustrates an embodiment of tangential-T fitting 224 employed as part of plumbing 220 in which a run pipe 222 is smaller in diameter than the diameter of a larger branch pipe 226. That is, these pipes seen in FIG. 7 are connected to one another by another embodiment of tangential-T fitting 224 according to this invention. In each case, the exposed plumbing (i.e., piping and fittings) 120 or 220 is subject to damage from a number of causes. For example, construction personnel may simply step on the plumbing while working within the excavation. Other sources of damage to the plumbing 120 or 220 may also result in damage. Because the plumbing 120 or 220 is frangible (i.e., it is made of plastic—usually PVC, although the invention is not so limited) it may be broken if stepped on, for example.

However, as FIG. 6 illustrates, because the tangential-T fitting 124 places the pipes 122 and 126 coextensive and tangent with one another on one side (i.e., on the lower side, viewing FIG. 6). The tangential-T fitting does so because the bores within the fitting 124 which receive the run pipes 122 and branch pipe 126 are also tangent or coextensive in a plane to one another along the one side (i.e., the bottom side) of these pipes, the pipes 122 and 126 are supported by soil or by rebar (illustrated as surface 36 in FIG. 6). That is, the surface 36 may be defined in this case within an excavation, for example. Consequently, should the pipes 122 or 126 be stepped on, they are much less likely to be cracked or broken. As can be appreciated, the pipes 222 and 226 are also tangential along their lower surfaces or sides, as is seen in FIG. 7, where the pipes are disposed upon or adjacent to reinforcing bars 214.

Further to the above, it can easily be appreciated viewing FIGS. 5-7, that should the surface 36 indicate a floor, or a vertical wall, for example, against which plumbing 120 or 220 is installed (by use of pipe straps, for example), then the plumbing 120/220 also will be essentially flat against the floor or wall, and will also in this instance be better protected against damage. In this instance also, because the plumbing 120/220 is essentially flat against a floor or wall to which it is secured, installation of the plumbing (i.e., using pipe straps or brackets, for example) is made much easier.

Figure 8:
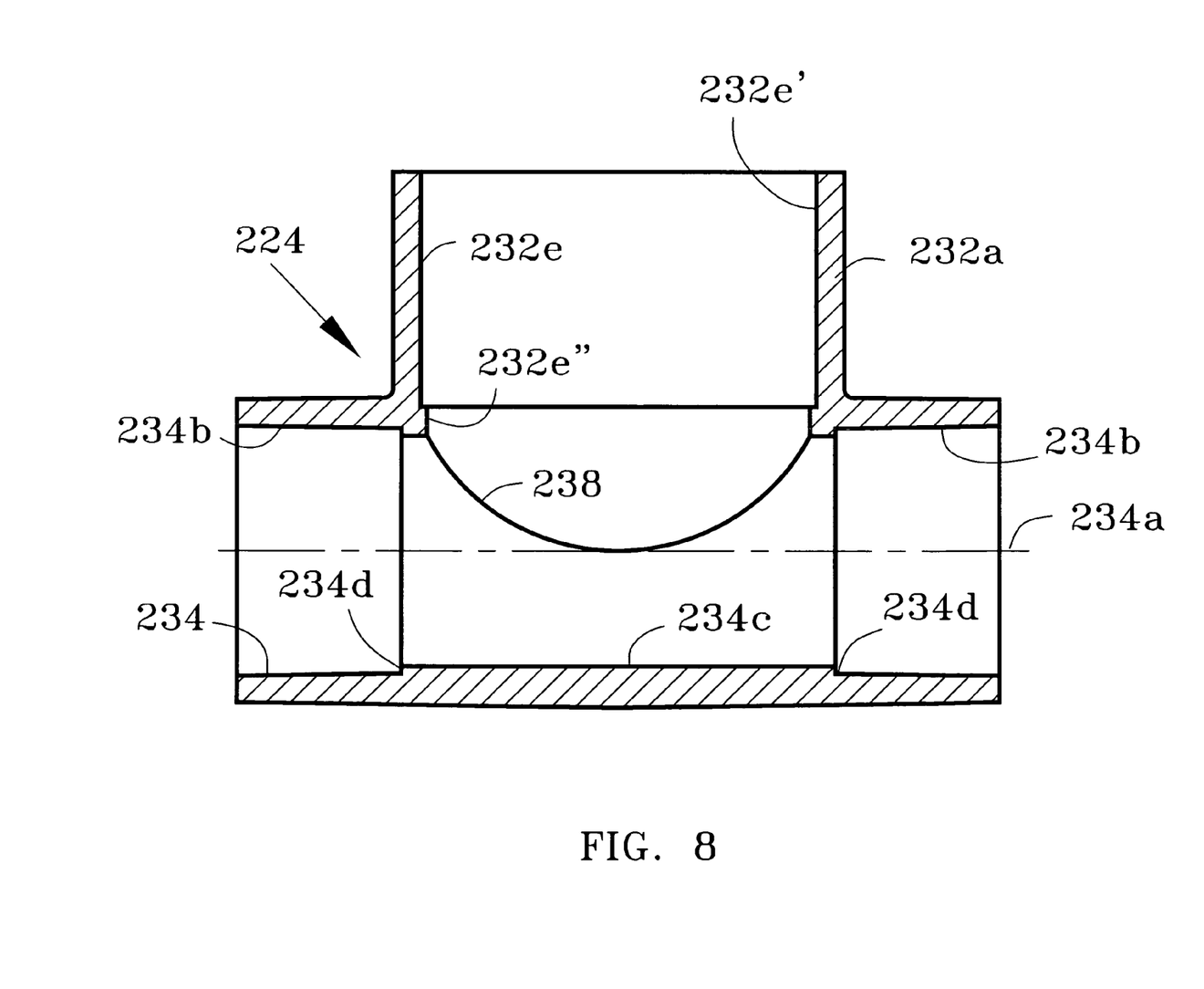
FIG. 8 is a cross sectional plan view of the plumbing fitting seen in FIG. 7, and is seen without the run and intersecting pipes for clarity of illustration.

Turning now to FIG. 8, a cross sectional view of the tangential-T fitting 224 seen in FIG. 7 is illustrated. In FIG. 8 it is seen that the body 232 of the tangential-T fitting 224 defines passage 234 as a stepped through bore having a centerline 234a, and a pair of opposite larger-diameter bore sections 234b, as well as a centrally disposed smaller-diameter bore section 234c. The sections 234b and 234c of bore 34 cooperatively define a pair of oppositely disposed shoulders 234d on the bore 234. The tangential-T fitting 232 also includes an orthogonally disposed cylindrical boss 232a which at its center is offset from the centerline 234a of the passage 234. This cylindrical boss 232a defines a stepped through bore 232e. The stepped bore 232e includes a larger diameter section 232e', and a smaller diameter section 232e". As was explained earlier, these sections 232e' and 232e" cooperatively define an outwardly disposed shoulder 232f, so that the cylindrical boss 232a also provides a pipe socket for receiving and adhesive bonding of the orthogonally disposed branch pipe 226 seen in FIG. 7. However, viewing FIG. 8, it is seen also that the bores 234c and 232e" cooperatively define a blending line 238, which because the bores are tangent along the side of the fitting seen in this plan view in cross section, carries substantially to the centerline 234a of the bore 234.

Figure 9:
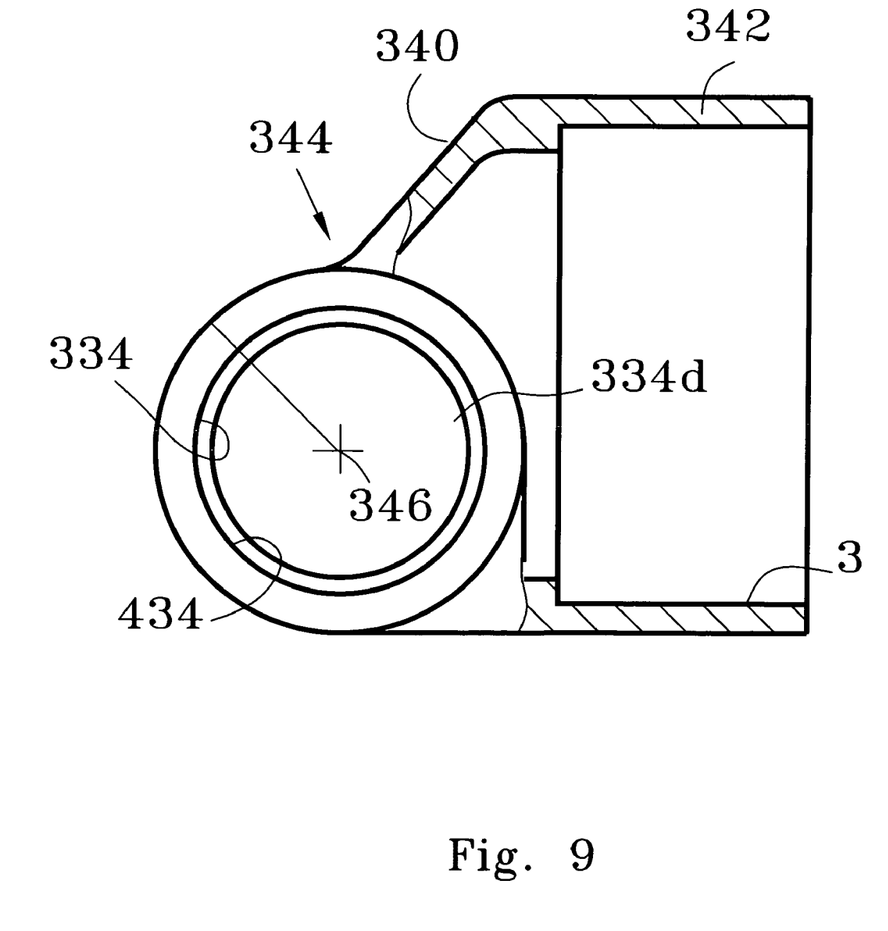
FIG. 9 provides a cross sectional view of the plumbing fitting seen in FIGS. 7 and 8.

FIG. 9 illustrates another unique aspect of the present tangential-T fitting. The fitting is like that seen in FIG. 7 in which the run piping is smaller than the branch pipe. In FIG. 9 features which are the same or analogous in structure or function to those already introduced are indicated with the same numeral used above, and increased by 100 from the last prior use. Viewing FIG. 9, it is seen that the sockets for the run piping (i.e., defined by the bores 334b, for example) may be especially configured so as to allow the body 332 of the fitting to be made by injection molding. It will be seen viewing FIG. 9 that a transition wall portion 340 extends from a cylindrical body section 342 inwardly defining the socket for receiving and adhesively bonding the branch pipe (not seen in FIG. 9) to the area of the sockets for the run pipes (which run pipes are also not seen in FIG. 9). In FIG. 9, it is seen that the transition wall portion 340 extends from the body section 342 to a location (indicated with arrowed numeral 344) aligned essentially vertically above the centerline 346 of the run pipe sockets 334.

Also viewing FIG. 9, it is seen that the shoulders 334d are circumferentially continuous. That is, the shoulders 334d are circumferentially uninterrupted and provide a continuous surface against which the end of an inserted run pipe may about when the end portion of the run pipe is adhesively bonded into the pipe socket 334.

Figure 9A:
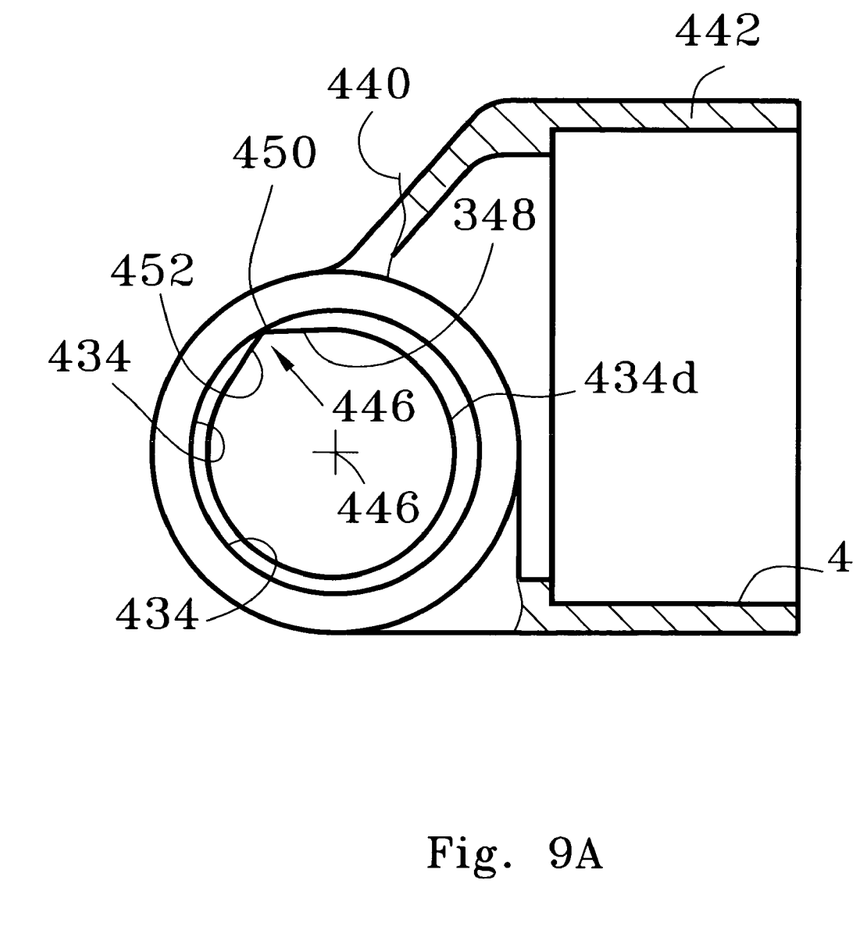
FIG. 9A provides a cross sectional view of an alternative embodiment of plumbing fitting similar to that shown in FIG. 9, but differing in certain details of construction.

In contrast to the embodiment seen in FIG. 9, the embodiment of FIG. 9A illustrates an alternative, high-flow, or low-pressure-drop embodiment of the present tangential-T fitting. It will be appreciated that the fittings of FIGS. 9 and 9A are similar, but also that the differ from one another as described below. In FIG. 9A features which are the same or analogous in structure or function to those already introduced are indicated with the same numeral used above, and increased by 200 from the last prior use. Viewing FIG. 9A, it is seen that the sockets for the run piping (i.e., defined by the bores 434b, viewing FIG. 9A) may be especially configured so as to allow the body 432 of the fitting to be more easily made by injection molding. It will be seen viewing FIG. 9A in comparison to FIG. 9 that each of these tangential-T fittings differs from one another outwardly in the configuration of a transition wall portion 440 extending from a cylindrical body section 442 (inwardly defining the socket for receiving and adhesively bonding the branch pipe, which branch pipe is not seen in FIG. 9A) to the area of the sockets for the run pipes (which run pipes are also not seen in FIG. 9A). In the embodiment of FIG. 9A the transition wall 440 extends tangent to the run pipe socket 434. An advantage of the configuration of fitting seen in FIG. 9A is that the larger diameter and greater area of flow path is provided communicating from the branch pipe past the centerline of the run pipes. This greater flow area allows a larger flow of water past the centerline of these run pipes and a decreased pressure drop for the fitting of FIG. 9A. That is, the fitting of FIG. 9A will have more flow to each of the branch pipes for a given pressure drop across this fitting, as a result of providing a larger flow path opening past or beyond (i.e., to the left, viewing FIG. 9A) the centerline of the run pipes.

Also viewing FIG. 9A, it is seen that the shoulders 434d are circumferentially discontinuous. That is, the shoulders 434d are circumferentially interrupted, and define a generally V-shaped notch, as indicated by arrowed numerals 446. This notch 446 is formed by the intersection of a straight line segment 448 which is parallel with the bore of the branch pipe connection socket, and extends to a point 450 at the larger diameter of bore 434. That is, the straight line segment 448 extends to the outer diameter of the bore defining the pipe socket for the run pipes, recalling the description of the first embodiment here presented. A straight line segment 452 extends from the point 450 to form a tangent to the smaller diameter of the bore 434, thus defining the V-shaped notch 446 (or circumferential discontinuity) in the shoulder 434d.

An advantage of the embodiments of fitting seen in FIGS. 9 and 9A is that during injection molding of the fittings, three movable cores preferably extend into a mold cavity which defines the outer surfaces of the fittings. These cores cooperatively define the inner surfaces of the fittings, and the space between the cavity and cores is filled by injected plastic (i.e., by PVC or another plastic polymer material). The notches 346/446 allow the cores defining the run pipe sockets to cooperate with the core forming the branch pipe socket, and allow for the removal of the cores after the injection molding process is complete, and the PVC or other polymer material is solidified.

Figure 10:
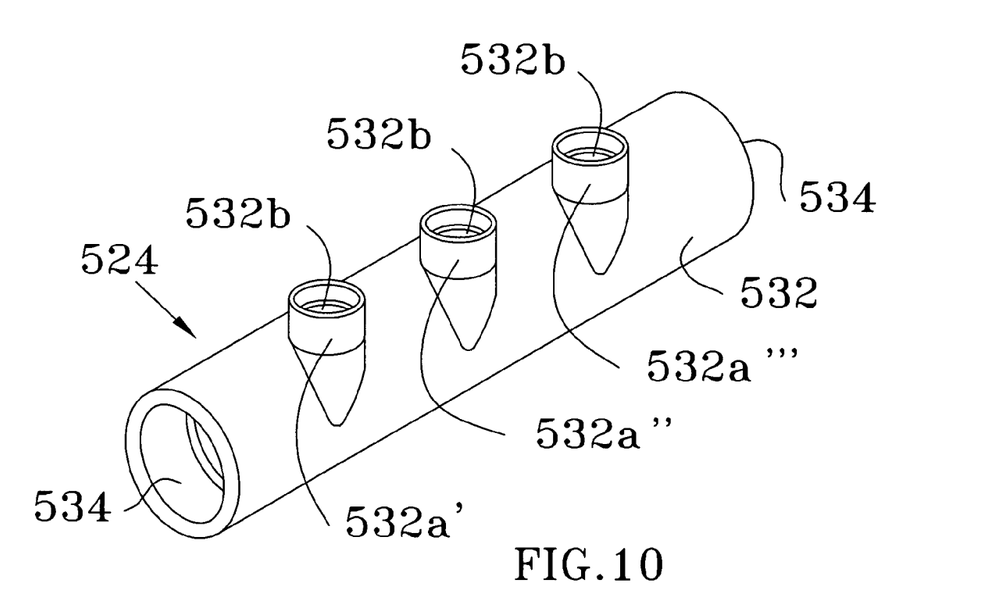
FIG. 10 provides a perspective view of an alternative embodiment of plumbing fitting according to this invention, which embodiment provides for plural offset branch connections to the same fitting.

Turning now to FIG. 10, an alternative embodiment of the tangential-T fitting according to this invention is illustrated in perspective view. Because this alternative embodiment of the invention has many features in common with the first embodiment described above, features of the alternative embodiment which are the same or analogous in structure or function to those described above are indicated on FIG. 5 with the same numeral used above but increased by five-hundred (500). As is seen in FIG. 5, a tangential-T fitting 524 includes a pair of opposed pipe sockets, each indicated with the numeral 534, and only one of which is seen directly in FIG. 10. This tangential-T fitting 524 includes a body 532, and plural (in this case 3, although the invention is not so limited) offset bosses 532a (with the individual bosses 532a being distinguished by having one or more primes added to the reference numeral). Each boss 532a provides a pipe socket 532b (with the individual sockets 532b being distinguished by having one or more primes added to the reference numeral). Thus, the tangential-T fitting seen in FIG. 10 provides for three connections to the main pipeline passing along the pipes connecting into sockets 534. The three connections (one at each of sockets 532*b*) are each offset toward the viewer of FIG. 10 to a tangential position like that illustrated in FIGS. 1-4. In fact, those ordinarily skilled in the pertinent arts will recognize that the end elevation view provided in FIG. 4 applies equally to the first embodiment illustrated in FIGS. 1-4, and to the embodiment of FIG. 10.

Accordingly, the present invention provides a tangential-T fitting which has advantageous application to the installation of plumbing arrangements, such as for example, the arrangement 20 seen in FIG. 1, although the invention is not so limited. The embodiment of FIGS. 1-4 provides for a single offset connection of a branch pipeline to a run pipeline, while the embodiment of FIG. 10 provides for plural branch pipelines to be connected to a run pipeline each in an offset relationship. While it is clear in the illustrations provided that the branch pipeline connections at cylindrical bosses 32*a* or 532*a* are tangential at one side to the passage of the pipeline 22 within the fitting, this need not be the case. That is, the branch connections can be offset as little (but a non-zero amount) or as much as is desired, up to the limit of being tangential at one side with the through passage of the fitting.

It should be understood, of course, that the foregoing relates to exemplary embodiments of the invention and that modifications may be made without departing from the spirit and scope of the invention as set forth in the following claims.

We claim:

1. A plumbing fitting formed of frangible plastic material and configured for adhesive attachment of plastic pipe, said fitting comprising:
an elongate body formed of frangible plastic material and defining a through bore having a centerline, said body providing for sealing connection of respective end termination portions of opposite pipes into respective opposite ends of said through bore;
said body also defining an orthogonal branch boss disposed intermediate of opposite ends of said elongate body and providing a branch bore opening on said orthogonal boss and communicating with said through bore and having a respective centerline, said body providing for sealing connection of a respective branch pipe end termination portion into said branch bore;
wherein said respective centerline of said branch bore is offset from said through bore centerline in end elevation view of said body, and intersects orthogonally with said through bore centerline in side elevation view, and further wherein said elongate body and said orthogonal branch boss are substantially coextensive along a side of said fitting;
wherein said through bore is stepped in order to provide a pair of oppositely disposed pipe sockets for adhesively sealingly receiving opposite end termination portions of respective opposite polyvinyl chloride pipes;
wherein said through bore defines a pair of oppositely disposed shoulders each defining an end for a respective one of said pair of oppositely disposed pipe sockets, and each of said pair of oppositely disposed shoulders being circumferentially interrupted;
wherein each of said pair of oppositely disposed shoulders is circumferentially interrupted by a respective V-shaped notch, with said V-shaped notch having one straight line segment disposed parallel with said branch bore.

2. The plumbing fitting of claim 1 wherein said V-shaped notch is further defined by another line segment tangent to said through bore, and said line segments intersecting at an outer diameter of said through bore.

3. An offset T-fitting especially formed of frangible plastic material and being configured to install a plumbing arrangement in a thin dam wall of a swimming pool or spa, said offset T-fitting comprising:
an elongate tubular body of polyvinyl chloride material, said elongate body defining a through bore having a centerline, and said body at opposite ends of said through bore providing respective oppositely disposed pipe sockets for sealing adhesive connection to said body to respective opposite end termination portions of connecting run pipes;
intermediate of said opposite ends of said elongate body said offset T-fitting also defining an orthogonal branch boss extending outwardly on said elongate body, said orthogonal branch boss providing a branch bore opening on said orthogonal boss and communicating with said through bore and having a respective centerline, said body providing at said branch bore a respective pipe socket for sealing adhesive connection of a respective branch pipe end termination portion into said branch bore; and
said respective centerline of said branch bore being offset from said through bore centerline in end elevation view of said body along said through bore, and said respective centerline intersects orthogonally with said through bore centerline in side elevation view of said offset T-fitting, so that said run pipes and said branch pipe are substantially coextensive with one another along one side substantially in a common plane;
wherein said through bore is stepped in order to provide a pair of oppositely disposed pipe sockets for adhesively sealingly receiving opposite end termination portions of respective opposite polyvinyl chloride pipes;
wherein said through bore at said steps defines a pair of oppositely disposed shoulders each defining an end for a respective one of said pair of oppositely disposed pipe sockets, and each of said pair of oppositely disposed shoulders being circumferentially interrupted;
wherein each of said pair of oppositely disposed shoulders is circumferentially interrupted by a respective V-shaped notch, with said V-shaped notch having one straight line segment disposed parallel with said branch bore.

4. The offset T-fitting of claim 3 wherein said V-shaped notch is further defined by another line segment tangent to said through bore, and said line segments intersecting at an outer diameter of said through bore.

5. A plastic T-fitting formed of frangible plastic material and being configured for adhesive attachment of plastic pipe, and said T-fitting also being especially configured so as to place attached plastic piping substantially in a coextensive common plane along one side, so that the attached plastic pipe may be better supported at said common plane by an underlying surface of earth or construction material, said T-fitting comprising:
an elongate body formed of frangible plastic material and defining a through bore having a centerline, said body providing for sealing connection of respective end termination portions of opposite pipes into respective opposite ends of said through bore, said through bore being stepped in order to provide a pair of oppositely disposed pipe sockets for adhesively sealingly receiving opposite end termination portions of respective opposite polyvinyl chloride pipes, and said through bore at said steps defining a pair of oppositely disposed shoulders each defining an end for a respective one of said pair of oppositely disposed pipe sockets, and each of said pair of oppositely disposed shoulders being circumferentially interrupted;

said body also defining an orthogonal branch boss disposed intermediate of opposite ends of said elongate body and providing a branch bore opening on said orthogonal boss and communicating with said through bore and having a respective centerline, said body providing for sealing connection of a respective branch pipe end termination portion into said branch bore; wherein said respective centerline of said branch bore is offset from said through bore centerline in end elevation view of said body, and intersects orthogonally with said through bore centerline in side elevation view, and further wherein said elongate body and said orthogonal branch boss are substantially coextensive along a side of said fitting;

wherein each of said pair of oppositely disposed shoulders is circumferentially interrupted by a respective V-shaped notch, with said V-shaped notch having one straight line segment disposed parallel with said branch bore.

6. The T-fitting of claim 5 wherein said V-shaped notch is further defined by another line segment tangent to said through bore, and said line segments intersecting at an outer diameter of said through bore.

7. The T-fitting of claim 6 wherein said one line segment terminates at a point on said outer diameter of said through bore, and said another line segment extending from said point to a tangent with a smaller diameter section of said through bore.

* * * * *